Jan. 20, 1959 R. C. MUTH ET AL 2,869,939
TEMPERATURE VARYING MEANS
Filed July 20, 1956
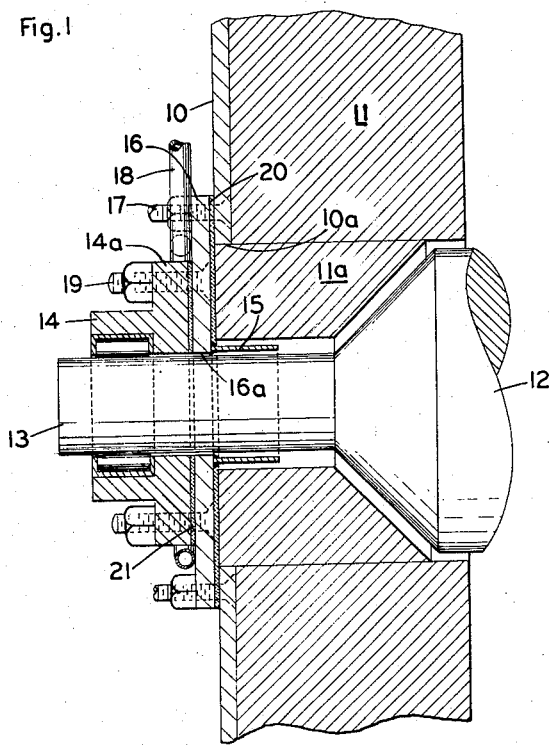
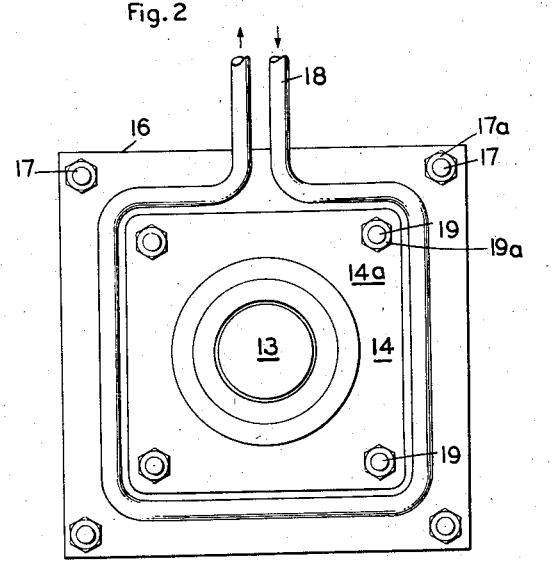
Inventors:
Robert C. Muth
George W. Hegel
by, Richard E. Hosley
Their Attorney

United States Patent Office 2,869,939
Patented Jan. 20, 1959

2,869,939

TEMPERATURE VARYING MEANS

Robert C. Muth and George W. Hegel, Shelbyville, Ind., assignors to General Electric Company, a corporation of New York Application July 20, 1956, Serial No. 599,211

6 Claims. (Cl. 308—77)

This invention relates to means for varying the temperature of a movable member without contact with the member and, more particularly, to means for a removing or a conducting-away heat from a rotatable member before that heat reaches the supporting bearing for the member.

In one type of high temperature industrial furnace, the furnace contains rollers on which the work is supported as it passes through the furnace. The rollers are generally mounted between bearings secured to the outside of the furnace casing. Of course, being located within the furnace, the rollers become quite hot and the heat is transmitted through them to the bearings, making it necessary to use expensive water-cooled bearings.

In addition, water-cooled bearings are not completely satisfactory in that they usually consist of cast-iron blocks with cored water passages. This construction tends to keep the outer race of the bearing quite cool, but permits the inner race to be heated by the roller. All of the heat that is removed by the cooling water must necessarily be transmitted through the bearing from the inner race to the outer race. Obviously, this condition is undesirable and contributes to shortening the life of the bearing.

Accordingly, a primary object of the present invention is to provide non-contacting means for removing or conducting away heat from a movable member before that heat reaches the supporting bearing of the member, thus permitting the use of relatively inexpensive standard bearings.

A further and more detailed object of the invention is to provide means which not only remove a considerable portion of the heat from the movable member before that heat reaches the bearing, but which also provides relatively uniform low-temperature heating of the bearing and prevents substantial heat transfer therethrough.

In one embodiment of the invention, a movable member, which is supported in bearing means and is subject to a source of heat, extends through a sleeve made of a relatively high thermal conductivity material. The sleeve surrounds and is spaced from a portion of the member in heat exchanging relationship therewith and is located between the source of heat and the bearing means. The sleeve is secured to a plate made of a material having a thermal conductivity substantially the same as the sleeve. Heat is transmitted from the movable member to the closely surrounding sleeve primarily by reason of radiation. It is intended that the bearing assembly including the bearing means, plate, and sleeve be utilized with a shaft constructed from material having a thermal conductivity substantially less than that of the sleeve. In this manner heat will be rapidly transmitted from the sleeve to the plate for dissipation, resulting in a substantial temperature differential between the sleeve and the shaft to provide optimum heat transfer, primarily by radiation, between the shaft and the sleeve. In order to increase the speed of heat dissipation from the plate, cooling means, such as a fluid carrying tube, may be secured in heat exchange relationship to the plate.

In one embodiment of the invention, the plate has an opening therein through which the rotatable member passes and the plate is located closely adjacent a conventional flange-type bearing in which the movable member is supported. Thus, the small amount of heat that is not removed from the plate by the cooling means is utilized to heat the bearing uniformly and prevent the transfer of large amounts of heat therethrough that tend to reduce the life of the bearing.

The novel features that are believed to be characteristic of the invention are set forth with particularity in the appended claims. The invention itself, together with further objects and advantages thereof, may best be understood by reference to the following description, taken in conjunction with the accompanying drawing, in which Fig. 1 is a sectional view of an embodiment of the temperature varying means of the invention applied to a roller of a roller hearth-type furnace; and Fig. 2 is a side view of the embodiment of the invention shown in Fig. 1.

Referring now to the drawing, the embodiment of the invention there shown is mounted on the wall of a typical industrial furnace of the roller hearth type. The illustrated portion of the furnace wall comprises a casing 10 which contains insulation 11 such as furnace brick or the like. The furnace includes a plurality of rollers 12, only one of which is shown in the drawing. The roller 12 is mounted on a roller shaft 13 which extends outwardly through an opening 10a in the casing 10. A suitably shaped piece 11a of furnace insulation may be utilized to fill in the opening 10a around the roller shaft 13 and the end of the roller 12.

As clearly shown in Fig. 1, roller shaft 13 is supported for rotation in a sealed flange-type bearing 14 having a flange 14a to provide means for securing the bearing to a supporting structure.

It is apparent that the roller 12 being located inside the furnace may become exceedingly hot and, in the absence of the invention to be hereafter explained, that heat would be transmitted through the roller shaft 13 to the bearing 14. Thus, the bearing 14 might become so hot that it would be ruined. Heretofore, this condition has required the use of large specially made water-cooled bearings.

In accordance with the present invention, means are provided to remove a considerable portion of the heat from the roller shaft 13 before it reaches the bearing 14. As illustrated, such means comprise a sleeve 15 which closely surrounds but is spaced from a portion of the roller shaft 13 between the bearing 14 and the origin of heat (in the furnace) of the roller. The sleeve 15 is in good heat exchanging relationship with the roller shaft 13. The sleeve 15 is secured, as by brazing, to a plate 16 that is attached to the outside of the furnace casing 10 by bolts 17 and nuts 17a, and having an opening 16a through which the shaft 13 passes. Of course, the sleeve 15 and plate 17 are also in good heat exchanging relationship. Cooling means, such as a cooling water tube 18, is brazed or otherwise secured to the plate 16.

The bearing 14 is secured to the plate 16 by means of bolts 19 and nuts 19a. A gasket 20 may be interposed between the furnace casing 10 and the plate 16 and another gasket 21 may be interposed between the plate 16 and bearing flange 14a.

The invention contemplates that the sleeve 15 and the plate 16 shall be constructed of materials having relatively high heat conductivity. As is well known, the heat conductivity of a metal is defined as the quantity of heat in calories which is transmitted per second through a plate one centimeter thick across an area of one square centimeter when the temperature difference is one degree centigrade. Among the metals suitable for this use are copper, aluminum, silver, gold, and tungsten, which have heat conductivities ranging from approximately 0.4 to 1.0, although the invention is not limited to the use of these particular materials. In practice, it has been found that the best balance between considerations of economy and efficiency may be realized by the use of copper, which has a heat conductivity of approximately 0.97, and that material is considered preferable for this use.

In the usual furnace construction, the roller 12 and roller shaft 13 are made of a steel alloy which has a heat conductivity in the vicinity of 0.1 or 0.2. Thus, there is a high temperature gradient along the roller shaft 13 from the roller 12 to its outer end. The sleeve 15 which closely surrounds the roller shaft 13 remote from the bearing 14 effectively removes a considerable portion of the heat from the roller shaft before it reaches the bearing. That heat in turn is transmitted from the sleeve 15 to the plate 16 and may be removed from the plate 16 by means of cold water or other cooling fluid flowing through the tube 18 secured to the plate. Because the plate 16 is constructed of a relatively high thermal conductivity material, that heat that is not removed from the plate by the cooling means is distributed substantially evenly throughout the plate. Therefore, the bearing flange 14a is also heated uniformly by the plate and there is no sharp temperature differential across the bearing 14. In this manner, the efficiency of the bearing is improved and the use of a relatively inexpensive conventional bearing is made possible.

As a matter of illustration only, it is pointed out that with the sleeve 15 made of thin copper 1 inch long and of 1½ inch inner diameter surrounding a 1 7/16 inch diameter roller shaft 13 and secured to a ¼ inch thick copper plate 16 cooled by cold water running through the tube 18, a conventional bearing of the type illustrated ran cooler than a water cooled bearing of the type previously used.

It is to be understood that a conventional roller hearth furnace embodies a plurality of rollers 12 and the ends of each roller are supported in structures like that illustrated. Of course, those rollers which are outside the furnace proper or in low-temperature zones need not necessarily be provided with the apparatus of the invention.

It is apparent from the foregoing description of one embodiment of the invention that various changes therein may be made by one skilled in the art. Therefore, it is intended by the appended claims to cover all such modifications as fall within the true spirit and scope of the invention.

What we claim as new and desire to secure by Letters Patent of the United States is:

1. A bearing assembly adapted to be mounted on a wall of a furnace and the like for the support of a shaft extending inwardly of the furnace where it will be subjected to heat comprising a bearing, a heat dissipating metal member disposed alongside the bearing and adapted to be located between the bearing and a portion of a shaft subjected to heat; and a hollow metal member mounted on the heat dissipating member in heat conducting relation therewith and extending coaxially thereof and away from the bearing for reception of a shaft to be supported by the bearing; the hollow member having an internal diameter selected to be greater than the outer diameter of the portion of a shaft received therein and so that the hollow member will surround the shaft in closely spaced relation; the hollow member being constructed of material having a thermal conductivity substantially the same as that of the heat dissipating member so that when the assembly is used with a shaft constructed of a material having a thermal conductivity substantially less than that of the hollow member, the hollow member will absorb heat from the shaft primarily by reason of radiation, which heat will be conducted through the sleeve to the heat dissipating member for dissipation, thus substantially reducing the heat transferred to the bearing by the shaft.

2. In combination, a shaft, a bearing assembly including a bearing supporting the shaft, a heat dissipating member disposed alongside the bearing, and a hollow metal member mounted in heat conducting relation on the heat dissipating member and surrounding the shaft in closely spaced relation and extending from the heat dissipating member in a direction away from the bearing, the hollow member being constructed of a material having a thermal conductivity substantially the same as that of the heat dissipating member and substantially greater than that of the shaft so that when the shaft is subjected to heat along a portion thereof on the side of the bearing corresponding to the location of the hollow member the hollow member will absorb a substantial portion of the heat of the shaft primarily by reason of radiation for conduction to the heat dissipating member, thus substantially reducing the transfer heat to the bearing by the shaft.

3. A bearing assembly adapted to be mounted on a wall of a furnace and the like for the support of a shaft extending within the furnace comprising a sealed bearing, a heat dissipating plate fixed to the bearing in sealed relation and adapted to be disposed between the bearing and a furnace wall, a tubular heat exchanging metal member carried by the plate in sealed heat conducting relation therewith and extending coaxially of and away from the bearing, the sleeve being constructed of a material having a thermal conductivity substantially the same as that of the heat dissipating plate and being adapted to receive a shaft supported in the bearing in closely spaced relation and to absorb heat from a shaft received therein primarily by reason of radiation.

4. In combination with a furnace and the like having an enclosing wall having an aperture, a shaft extending through the wall aperture, a sealed bearing disposed externally of the furnace and supporting one end of the shaft, a metal plate mounting the bearing on the wall and disposed between the bearing and wall in sealed relation to the wall aperture, a sleeve mounted on the plate in heat conducting relation therewith extending from the plate inwardly of the furnace in closely spaced surrounding relationship to the shaft, the sleeve being fabricated of a metal having a thermal conductivity substantially the same as the plate and substantailly greater than the portion of the shaft surrounded by the sleeve.

5. In combination, a shaft, a sealed bearing supporting the shaft, a heat dissipating plate fixed to the bearing, in sealed relation and having an aperture through which the shaft extends, means for mounting the plate on a furnace wall and the like with the bearing being disposed on the side of the plate opposite the wall, a tubular heat exchanging metal member carried by the plate in sealed heat conducting relation therewith surrounding said aperture in the plate and extending coaxially of and away from the bearing, the sleeve receiving the shaft in closely spaced relation and being constructed of a material having a thermal conductivity substantially the same as that of the heat dissipating plate and greater than that of the shaft.

6. A bearing assembly adapted to be mounted on the wall of a furnace and the like for the support of a shaft extending inwardly of the furnace comprising a bearing, a heat dissipating copper plate fixed to the bearing and extending outwardly thereof, the plate having an aperture disposed concentrically of the bearing axis for the reception of a shaft for support by the bearing, cooling means on the plate on a portion thereof disposed outwardly of the bearing, a copper sleeve mounted on the plate member in heat conducting relation therewith and surrounding said aperture and extending coaxially of the bearing and in a direction away therefrom, the sleeve being adapted to receive a shaft supported by the bearing in closely spaced relation and providing means for cooling the shaft primarily by reason of radiation of heat from the shaft to the sleeve and conduction thereof through the sleeve to the plate.

References Cited in the file of this patent

UNITED STATES PATENTS

| | | |
|---|---|---|
| 1,773,909 | Korb | Aug. 26, 1930 |
| 2,129,468 | Heck | Sept. 6, 1938 |
| 2,142,931 | Baker | Jan. 3, 1939 |
| 2,755,989 | Coward | July 24, 1956 |